(12) United States Patent
Miyazaki et al.

(10) Patent No.: US 7,191,969 B2
(45) Date of Patent: Mar. 20, 2007

(54) FISHING REEL

(75) Inventors: Takeo Miyazaki, Kiyose (JP); Akio Sekimoto, Iruma (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 11/352,223

(22) Filed: Feb. 13, 2006

(65) Prior Publication Data
US 2007/0007377 A1   Jan. 11, 2007

(30) Foreign Application Priority Data
Jun. 27, 2005   (JP)   ............... P2005-186170

(51) Int. Cl.
*A01K 89/02*   (2006.01)
(52) U.S. Cl. .................... 242/283; 242/282
(58) Field of Classification Search ............... 242/244, 242/245, 282, 283, 295; D22/140, 141
See application file for complete search history.

(56) References Cited

U.S. PATENT DOCUMENTS

| 2,561,935 | A | * | 7/1951 | McCash ............... 242/228 |
| 2,564,975 | A | * | 8/1951 | Holm ................... 242/292 |
| 3,026,058 | A | * | 3/1962 | Evelyn et al. ......... 242/244 |
| 3,224,703 | A | * | 12/1965 | Clark .................. 242/242 |
| 4,056,246 | A | * | 11/1977 | Purcell ................ 242/270 |
| 4,958,785 | A | * | 9/1990 | Aoki .................... 242/295 |
| D373,404 | S | * | 9/1996 | Atherton et al. ...... D22/140 |
| D374,059 | S | * | 9/1996 | Atherton et al. ...... D22/140 |
| D374,475 | S | * | 10/1996 | Robbins .............. D22/141 |
| 5,692,692 | A | * | 12/1997 | Zwayer ............... 242/244 |
| D432,202 | S | * | 10/2000 | Kim et al. ............ D22/140 |
| 6,874,719 | B2 | * | 4/2005 | Ikuta ................... 242/319 |

FOREIGN PATENT DOCUMENTS

JP   11-253078 A   9/1999

* cited by examiner

*Primary Examiner*—Emmanuel M Marcelo
(74) *Attorney, Agent, or Firm*—Sughrue Mion, PLLC

(57) ABSTRACT

A fishing reel includes: a reel body; a spool rotatably supported by the reel body; a handle shaft rotatably supported by the reel body; a handle arm provided at a distal end of the handle shaft; a transmission mechanism that transmits a rotation of the handle shaft to the spool via a drag device capable of adjusting braking force; and a braking force controlling element rotatably supported by the handle shaft, the braking force controlling element including an adjusting portion for adjusting the braking force applied to the drag device and an operation portion for the adjusting portion. The operation portion radially extends from an axis center of the handle shaft, and includes a bent portion which is formed at an intermediate portion of the operation portion and bent toward the reel body side.

3 Claims, 5 Drawing Sheets

BRAKING FORCE DECREASING DIRECTION

BRAKING FORCE INCREASING DIRECTION

FISHING REEL

BACKGROUND OF THE INVENTION

The present invention is related to a fishing reel provided with a transmission mechanism for transmitting a rotation of a handle shaft to a spool through a drag (braking) mechanism, and especially related to a fishing reel provided with an operating portion for adjusting a braking force of a drag mechanism, which is coaxial with a handle shaft.

A related fishing reel provided with a transmission mechanism for transmitting a rotation of a handle shaft to a spool is usually provided with a drag mechanism and includes an operating portion for adjusting the braking force thereof.

As such a fishing reel provided with the operating portion for adjusting the braking force, a fishing reel described in Japanese Patent Publication JP11-253078A is known, for example. FIG. 5 shows a perspective view illustrating an appearance of a double-bearing type fishing reel which is one kind of the fishing reel described in the above Japanese Patent Publication, and FIG. 6 shows a front view of the fishing reel, a part of which is shown as cross-sectional view.

As shown in FIG. 6, the double-bearing type fishing reel includes: a reel body 101 having a spool 115; a handle assembly 102 for rotating the spool, which is arranged at a side of the reel body 101 and has a crank arm 106 and a handle knob 107; a star drag 103 arranged to the handle assembly 102 at side of the reel body 101. The reel body 101 is adapted to be attached to a fishing rod R through a rod attaching let 104.

As shown in FIG. 7, the fishing reel includes: a frame having a pair of right and left side plates 110, 111 and a plurality of connecting members 112 for connecting the pair of side plates, and first and second cover 113, 114 attached to the opposite sides of the frame 105. These members are assembled integrally.

A first rotation transmission mechanism 120 and a clutch mechanism 121 for transmitting torque from the handle assembly 102 to the spool 115 are provided inside the second cover 114. The first rotation transmission mechanism 120 includes a rotation control mechanism 122 for restricting the transmission of the torque when the torque is reversely transmitted from the spool 115 to the handle assembly 102.

A spool shaft 125 of the spool 115 is rotatably supported through bearings 126 by the cover 113, 114, respectively. The first rotation transmission mechanism 120 includes a handle shaft 130, one end of which is fixed to the handle assembly 102, a main gear 131 coupled to the other end of the handle shaft 130 through the rotation controlling mechanism 122, and a pinion gear 132 engaged with the main gear 131. The handle shaft 30 is rotatably supported by the side plate 111 at one end.

When the pinion gear 132 is slid along the spool shaft 125 and clutch is turned on, the clutch mechanism 121 transmits the rotating force between the spool shaft 125 and the pinion gear 132, and when the clutch is turned off, the spool 115 can be freely rotated. The pinion gear 132 is always urged in a state in which clutch is turned on, and the clutch is turned off by manipulating a clutch lever 109 (see FIG. 6) projected from the second cover 114.

The rotation controlling mechanism 122 includes a roller type one-way clutch mechanism 140 for allowing a handle shaft 130 to rotate only in line winding direction (inhibiting the rotating in line reeling out direction), a draft mechanism 150 for applying the set braking force to the rotation in the line reeling out direction of the spool 115, and a ratchet mechanism 160 for allowing the handle shaft 130 to rotate only in the line winding direction.

With the related fishing reel having the above structure, when the handle assembly 102 is rotated in the line winding direction in order to wind the reeled-out fishing line, the rotation thereof is transmitted from the handle shaft 130 to the spool 115 through the one-way clutch mechanism 140, the drag mechanism 150, the main gear 131 and the pinion gear 132. At this time, if the pulling force of caught fish is small, the spool 115 does not rotate in the direction in which the fishing line is spooled out. However, if the pulling force of the caught fish is large and the rotating force of the spool in the line winding direction is increased, and the rotating force exceeds the set rotating resisting force of the drag mechanism 150, the spool 115 with the main gear 131 starts rotating in the direction in which the fishing line is spooled out since the drag mechanism 150 is activated (slid). At this time a certain resisting force, i.e. drag force from the drag mechanism 150 is always applied to the spool 115 and a tension applied to the fishing line is secured.

On the other hand, when the handle knob 107 is rotated in order to wind on the spool 115 the fishing line to which the load is applied, a part of the force acts on the fishing rod R through the rod attaching leg 104 of the reel body 101. Thus, winding operability is deteriorated since the fishing rod R is swung irregularly vertically and horizontally, and therefore, winding efficiency becomes low. In order to suppress this, in the double-bearing fishing reel, a distance from the rod attaching leg 104 to an application point of the rotating force is set short to suppress the generation of swing of the rod R. Specifically, the crank arm 106 is bent at a first position 106b which is an intermediate portion of a fixing portion 106a and a base end of the handle knob 107 in a direction approaching the reel body 1, and the crank arm 106 is bent again at a second position so as to be parallel to the surface of the fixing portion 106a.

However, in the related fishing reel (double-bearing type fishing reel), the star drag 103 for adjusting the braking force acting on the drag mechanism 150 is arranged to the handle assembly 102 at the side of the reel body 101 adjacent to the crank arm 106, and further since the star drag 103 screwed to the handle shaft 130 is rotated in the vicinity of the handle shaft 130 at the time of adjusting the braking force, to prevent the star drag 103 from being contact with the bent portion 106b of the crank arm 106 when rotating the star drag 103, the bent portion 106b of the crank arm 106 is positioned not interfering with the star drag 103, that is, the bent portion 106b is located so as to exceed the length of the star drag 103. Therefore, in the related fishing reel, a radial length of the whole handle including bent portion, flat portion and handle knob becomes necessarily long, and thus there is a problem in which such a fishing reel is not suitable for the compact reel (bait casting reel) which frequently performs casting and reeling.

SUMMARY OF THE INVENTION

To solve the above-mentioned problem, an object of the invention is to provide a fishing reel suitable for a compact fishing reel which is provided with a short handle and frequently performs casting and reeling operation.

Another object of the invention is to improve the operability of the operating member (star drag) for performing adjusting operation for braking force of the drag mechanism.

In order to solve the aforesaid object, the invention is characterized by having the following arrangement.

(1) A fishing reel comprising:
   a reel body;
   a spool rotatably supported by the reel body;
   a handle shaft rotatably supported by the reel body;
   a handle arm provided at a distal end of the handle shaft;
   a transmission mechanism that transmits a rotation of the handle shaft to the spool via a drag device capable of adjusting braking force; and
   a braking force controlling element rotatably supported by the handle shaft, the braking force controlling element including an adjusting portion for adjusting the braking force applied to the drag device and an operation portion for the adjusting portion,
   wherein the operation portion radially extends from an axis center of the handle shaft, and includes a bent portion which is formed at an intermediate portion of the operation portion and bent toward the reel body side.

(2) The fishing reel according to (1), wherein an intermediate portion of the handle arm which extends from the axis center of the handle shaft toward a distal end thereof is bent toward the reel body side along the bent portion of the operation portion.

(3) The fishing reel according to (1), wherein the handle arm extends in both sides from the axis center of the handle shaft and knob portions are provided at opposite distal end surfaces of the handle shaft.

(4) The fishing reel according to (3), wherein the distal end surfaces are parallel to a portion of the handle arm attached to the handle shaft.

DETAILED DESCRIPTION PREFERRED EMBODIMENTS

A fishing reel according to an embodiment of the present invention will be described with reference to the accompanying drawings. In the embodiment, a round shape double-bearing type fishing reel is employed as an example of the fishing reel.

Figure 1:
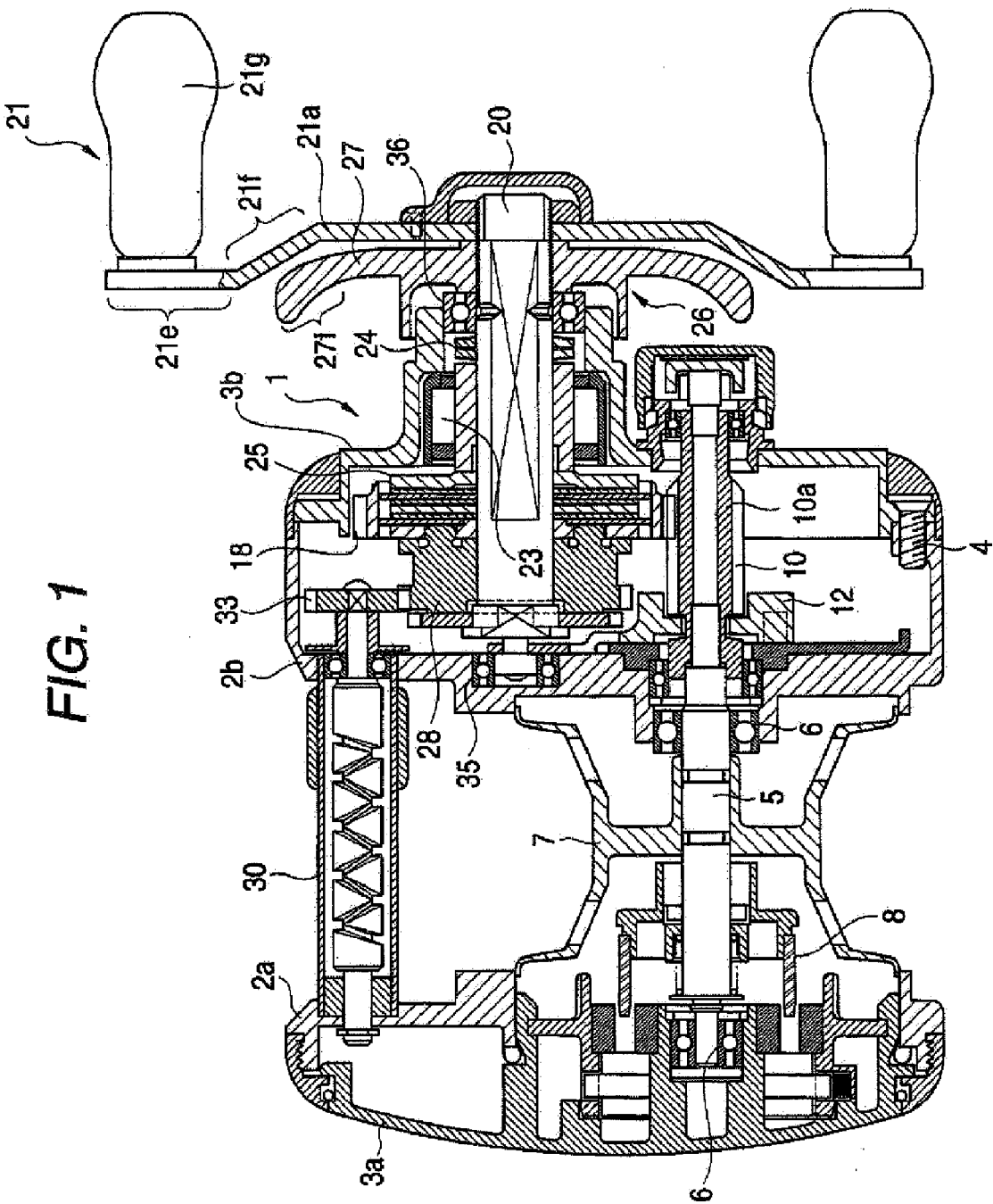
FIG. 1 shows a front view illustrating round shape double-bearing type fishing reel according to the embodiment, a part of which is shown as a cross-sectional view.

FIG. 1 shows a front view illustrating round shape double-bearing type fishing reel according to the embodiment, a part of which is shown as a cross-sectional view. As shown in FIG. 1, a reel body 1 includes a pair of right and left frames 2a, 2b, and a pair of right and left round shape side plates 3a, 3b arranged at the side portions of the right and left frames 2a, 2b, respectively. The right and left side plates 3a, 3b are attached to the right and left frames 2a, 2b, respectively, and in the embodiment, the left side plate 3a is detachably attached thereto, and the right side plate 3b is fixed thereto by a screw 4.

An anti-backlash device 8 for preventing backlash at the time of reeling out fishline by preventing over speed of the spool 7 is provided to a spool shaft 5 at the side of the left side plate 3a. A pinion 10 engageable with the spool shaft 5 by sliding in an axial direction is rotatably supported through a pinion shaft 10a by the right side plate 3b. The pinion 10 is formed with a circumferential groove engaged with the a clutch plate 12. By moving the clutch plate 12 in the axial direction along the pinion shaft 10a, the pinion 10 can be engaged with the spool shaft 5 (clutch ON), and can be disengaged from the spool shaft 5 (clutch OFF).

On the other hand, a handle shaft 20 that supports a drive gear 18 engaged with the pinion is rotatably supported by a bearing 36 at a base portion side and an axial movable bearing 36 (described later in connection with a drag operation). A handle arm 21a of a handle 21 is provided at the distal end of the handle shaft 20, and a knob portion 21g rotatable with respect to the arm 21a is provided at the distal end of the handle arm 21a.

A one-way clutch 23 is attached to an intermediate portion of the handle shaft 20. A friction plate 25 of a drag device engaged with the drive gear and a braking force controlling element 26 provided with a drag operation portion 27 for adjusting braking force applied to the friction plate of the drag device are provided at a base end portion of the handle shaft 20. The braking force controlling element 26 is supported by the handle shaft 20 by screw, for example, and is moved in the axial direction by the rotation operation of the drag operation portion 27. The axially movable bearing 36 is abutted against the braking force controlling element 26 by spring force of a spring plate 24, and the pressing force is transmitted to the friction plate 25 of the draft device engaged with the drive gear through the spring plate 24, thereby force applied to the friction plate 25 can be adjusted by moving the braking force controlling element 26 in the axial direction and predetermined drag force can be applied to the drive gear 18 which is frictionally coupled to the friction plate.

The drag operation portion 27 is formed with a plurality of projections that radially extends from the axial center of the handle shaft 20 so as to be close to the handle 21 attached to the distal end of the handle shaft 20 (see FIGS. 2, 3 and 5 described later).

The handle shaft 20 is provided with a gear 28 rotating together with the drive gear 18. The gear 28 is engaged with a drive gear 33 for driving a level wind device 30.

With this arrangement, when the handle 21 is rotated, the rotation is transmitted from the drive gear 18 to the drive gear 33 and the spool 7 through the gear 28 and the pinion 10, respectively, thereby the spool 7 is rotated and the level wind device 30 is driven so that the fishline is evenly wound on the spool 7.

Next, the description are made as to the handle 21 and the braking force controlling element 26 attached to the handle shaft 20 of the fishing reel.

As described above, in the related fishing reel, to enhance the operability of the reeling handle, the handle arm is bent toward the reel body side. The bent position is restricted by the drag operation portion (star drag in the related example) provided so as to be close to the handle arm, and the bent position cannot be set at a position where the drag operation portion exists. Thus, an arm length become long and it is not suitable for a compact fishing reel.

Figure 4:
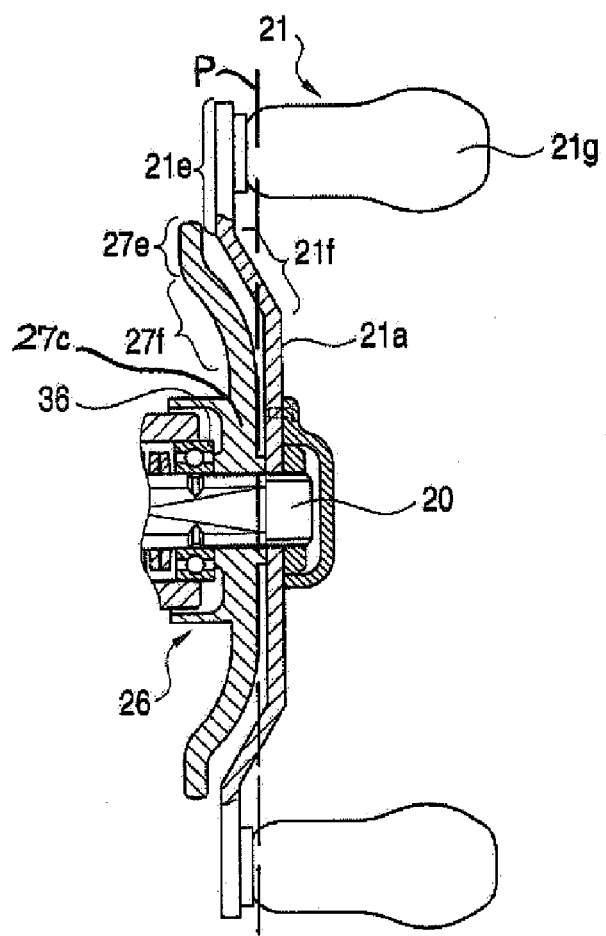
FIG. 4 shows an embodiment in which an index portion is applied to the drag operation portion of the reel according to the embodiment of the present invention.

According to the present invention, a plurality of projections of the operation portion 27 (drag operation portion), projected radially from a center portion 27c of the operation portion 27 which is disposed near the axial center of the handle shaft 20, are bent to form bent portions 27f, and a bent portion 21f of the handle arm 21a that extends from the axial center of the handle shaft 20 to the distal end thereof and opposed to the bent portion 27f of the drag operation portion is bent so as to be along with the bent portion 27f of the drag operation portion 27, so that the handle arm 21a does not contact the drag operation portion 27 when being rotated. As shown in FIGS. 1 and 4, a distal end 21e of the handle arm 21a extends over a plane P on which the outer surface of the center portion 27c resides. With this arrangement, a radial length of the handle arm 21a can be shortened as compared with the related bait casting reel provided with a flat drag operation portion (which does not have a bent portion). Therefore, the fishing reel according to the present invention is suitable for a compact reel which is provided with a short handle and frequently performs casting and reeling operations.

The bent portion 27f of the drag operation portion as shown in FIG. 1 allows a rotating operation of the braking force controlling element 26 with a natural finger action when operating the drag operation portion 27 by a finger while holding the reel at the time of drag operation. That is, at the time of drag operation, a forefinger or a thumb rotating the drag operation portion 27 of the braking force controlling element 26 of the reel held by the hand of the angler is usually put on the operating face of the drag operation portion 27 in an inclined state with respect to the handle shaft 20. Thus, with providing the bent portion 27f, the finger can be comfortably fit to the operation portion at the time of operation (rotating, pushing). Thus, as compared with the related flat operation portion (no bent portion), operability is enhanced. Especially, when adjusting the drag while holding the handle knob portion 21g with the palm of the hand, the drag operation portion 27 is rotationally operated in a tightening direction by the forefinger or in a releasing direction by the thumb. At this time, the rotation operation can be done with moderate natural finger action.

As described above, the embodiment of a combination of the drag operation portion 27 provided with the bent portion 27f and the handle arm 21a provided with the bent portion 21f has been described. However, the present invention is not limited thereto, and the bent portion 27f may be provided only at the drag operation portion 27.

Figure 2:
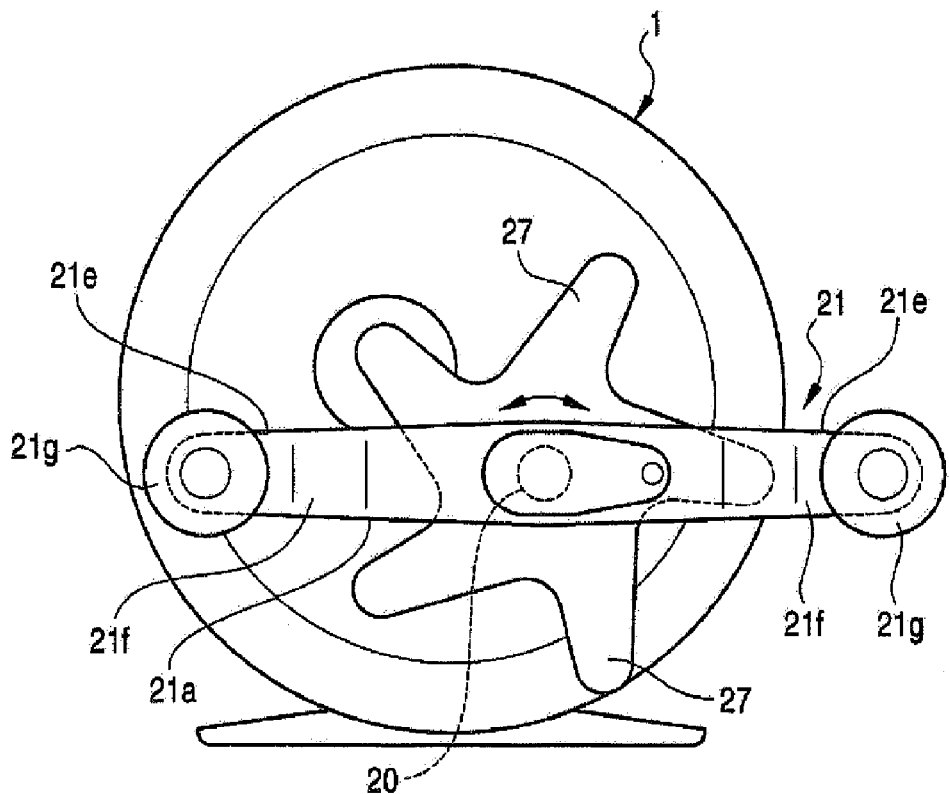
FIG. 2 shows a right side view of the reel according to the embodiment of the invention.

FIG. 2 is a drawing showing a right side of the fishing reel shown in FIG. 1. As shown in this figure, as to the handle arm 21a of the handle 21 attached to the distal end of the handle shaft 20, a pair of knob portions 21g are rotatably provided at the distal end of the arm extending so that the center line of the arm passes through the center axis of the handle shaft. The pair of knob portions 21g are provided so as to be located equidistance from the axis center of the handle shaft 20, that is, symmetrical to the axis center, to obtain good rotating balance and the best operability.

Distal end portions 21e of the arm attached to the bent portion 21f are made to be parallel surfaces (which are parallel to portions 21a attached to the handle shaft 20), and the knob portions 21g are provided at the parallel surfaces, respectively.

The braking force controlling element 26 is coaxially and rotatably provided to the handle 21, and includes the drag operation portion 27 having plural projections which are circumferentially disposed and extend radially from the axis center of the handle shaft 20. The drag operation portion 27 is provided with an operation surface in which an rotating operation in the tightening direction (braking force increases) and in the releasing force (braking force decreases) can be done without interfering with the handle 21 at any rotating position of the handle 21. As shown in FIG. 2, the drag operation portion 27 has a star shape constituted by the plurality of projections. An inclination of operation surfaces may be varied in accordance with the rotating direction. That is, an inclination of a surface against which the forefinger abuts in the tightening direction (braking force increasing direction) may be set different from an inclination of a surface against which the thumb abuts in the releasing direction (braking force decreasing direction). Incidentally, in FIG. 2, the drag operation portion 27 is inclined in the tightening direction, i.e., clockwise direction.

Figure 3:
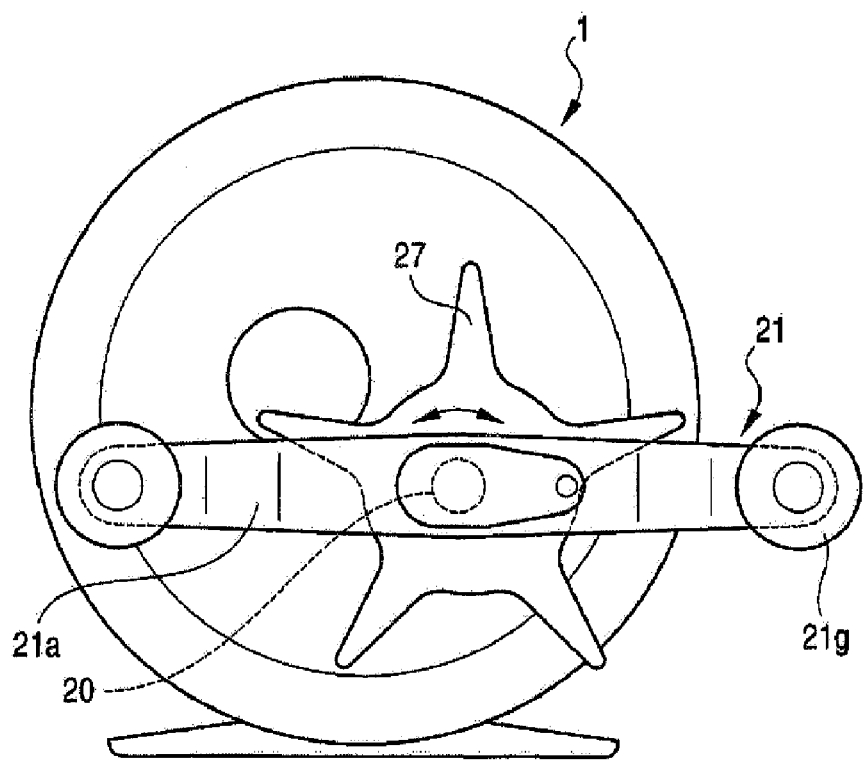
FIG. 3 shows a modification example of a projection shape of a drag operation portion of the reel shown in FIG. 2.

FIG. 3 is a drawing showing a right side surface of the fishing reel as shown in FIG. 1 in the same manner as like 2. As shown in FIG. 3, the shape of the projection of the drag operation portion 27 may be tapered at the distal end as compared in FIG. 2, to make the reel suitable for compact reel.

Figure 5:
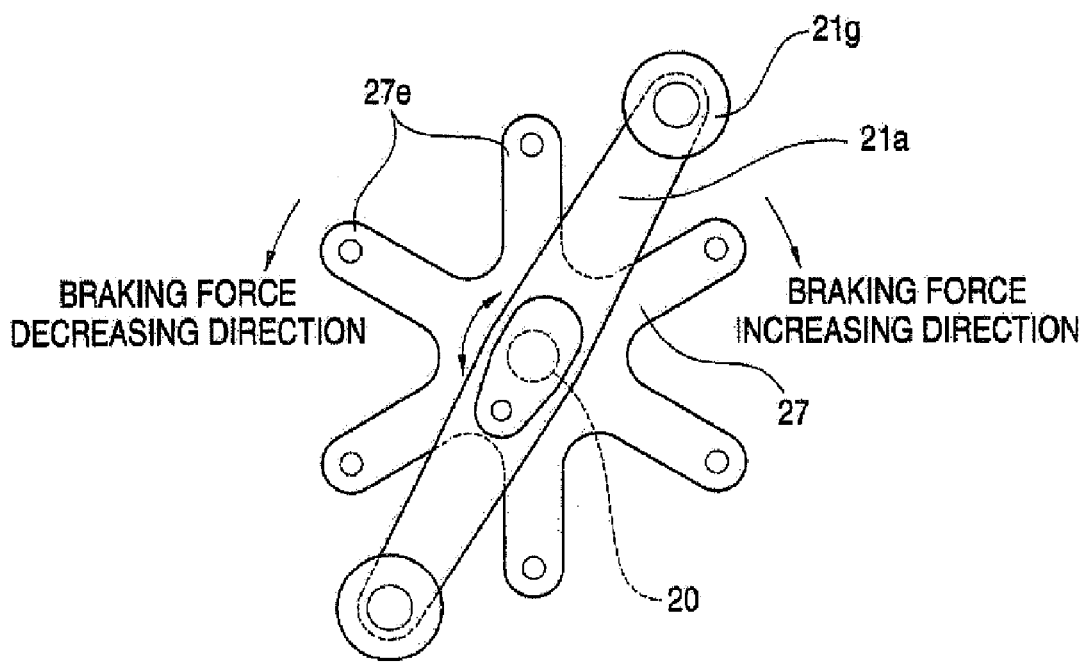
FIG. 5 shows a right side view of a main part of a reel according to another embodiment of the present invention.
Figure 6:
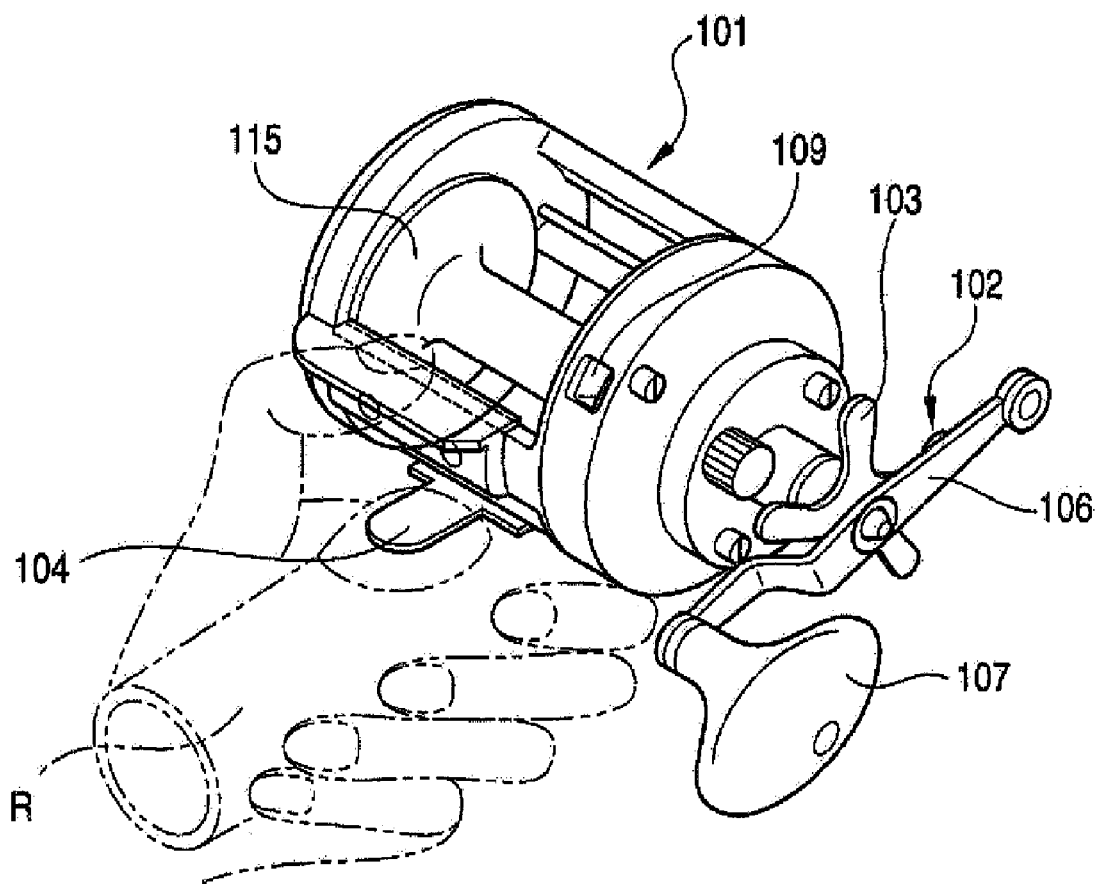
FIG. 6 shows a perspective view showing an exterior of a related double-bearing type fishing reel.
Figure 7:
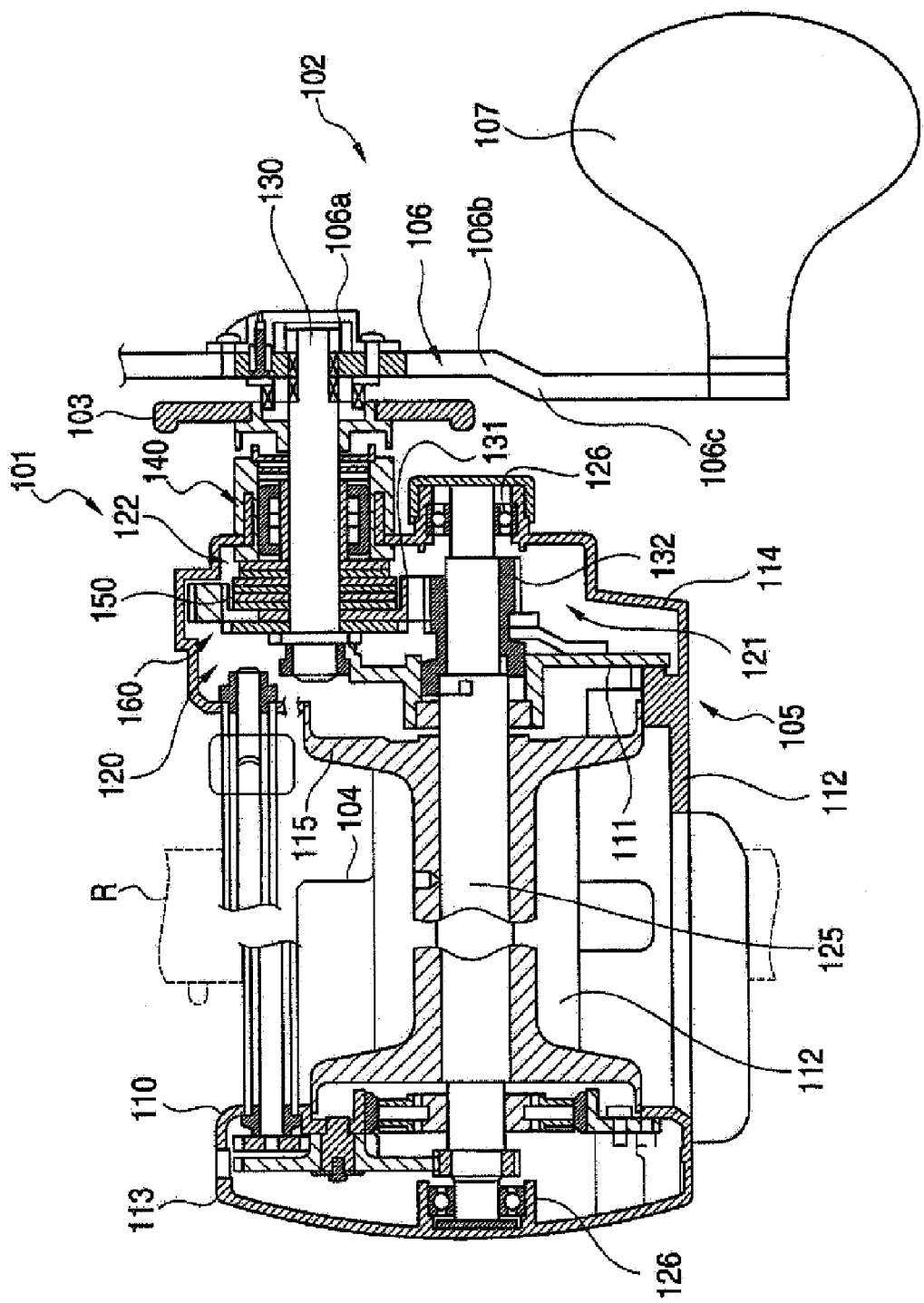
FIG. 7 shows a front view showing a configuration of the related double-bearing type fishing reel, a part of which is shown as a cross-sectional view.

FIGS. 4 and 5 show an embodiment in which an index portion as instruction means for instructing rotating directions in which the braking force of the drag device is increased or decreased is applied to the drag operation device 27. FIG. 4 shows a main part thereof corresponding to FIG. 1. FIG. 5 is a side view showing a main part thereof corresponding to FIG. 2.

The index portion applied to the drag operation portion 27 informs the angler of whether the rotating direction of the drag operation portion 27 is the tightening direction (braking force increasing direction) or the releasing direction (braking force decreasing direction) at the time of adjusting the drag (braking force).

Specifically, as shown in FIG. 5, one of the projections of the drag operation portion 27 is set as a reference (the projection on which index "○" is marked at the distal end in the drawing). If clockwise direction is the tightening direction (braking force increasing direction), an index "+" is marked on the projection located at the right side of the reference projection, and if counterclockwise direction is the releasing reaction (braking force decreasing direction), an index "−" is marked on the projection located at the left side of the reference projection. Thereby, the direction of the drag (braking force) adjustment that the angler wants to do can be informed.

Since it is difficult to view the index if the index is marked on the bent portion 27f, it is preferable that the distal end portion 27e continued from the bent portion 27f is made flat surface and a position where the index is provided in the projection of the drag operation portion 27 is set on the flat surface.

What is claimed is:

1. A fishing reel comprising:
   a reel body;
   a spool rotatably supported by the reel body;
   a handle shaft rotatably supported by the reel body;
   a handle arm provided at a distal end of the handle shaft;
   a transmission mechanism that transmits a rotation of the handle shaft to the spool via a drag device capable of adjusting braking force; and
   a braking force controlling element rotatably supported by the handle shaft, the braking force controlling element including an adjusting portion for adjusting the braking force applied to the drag device and an operation portion for the adjusting portion,
   wherein the operation portion includes a plurality of projections which radially extend from a center portion thereof near an axis center of the handle shaft, and each of the plurality of projections includes a bent portion and an intermediate portion, the bent portion formed at the intermediate portion of the operation portion and bent toward the reel body side, and
   wherein a distal end portion of the handle arm is bent toward the reel body side so as to extend over a plane on which an outer surface of the center portion of the operation portion resides.

2. The fishing reel according to claim 1, wherein the handle arm extends in both sides from the axis center of the handle shaft and knob portions are provided at opposite distal end surfaces of the handle shaft.

3. The fishing reel according to claim 2, wherein the distal end surfaces are parallel to a portion of the handle arm attached to the handle shaft.

* * * * *

(12) INTER PARTES REEXAMINATION CERTIFICATE (919th)
United States Patent
Miyazaki et al.

(10) Number: US 7,191,969 C1
(45) Certificate Issued: Jul. 29, 2014

(54) FISHING REEL

(75) Inventors: Takeo Miyazaki, Kiyose (JP); Akio Sekimoto, Iruma (JP)

(73) Assignee: Daiwa Seiko, Inc., Higashikurume-shi, Tokyo (JP)

Reexamination Request:
No. 95/000,642, Dec. 7, 2011

Reexamination Certificate for:
Patent No.: 7,191,969
Issued: Mar. 20, 2007
Appl. No.: 11/352,223
Filed: Feb. 13, 2006

(30) Foreign Application Priority Data

Jun. 27, 2005 (JP) ................. P2005-186170

(51) Int. Cl.
*A01K 89/02* (2006.01)
(52) U.S. Cl.
USPC .......................... 248/283; 248/282
(58) Field of Classification Search
USPC ................................ 242/282, 283
See application file for complete search history.

(56) References Cited

To view the complete listing of prior art documents cited during the proceeding for Reexamination Control Number 95/000,642, please refer to the USPTO's public Patent Application Information Retrieval (PAIR) system under the Display References tab.

*Primary Examiner* — Matthew C. Graham

(57) ABSTRACT

A fishing reel includes: a reel body; a spool rotatably supported by the reel body; a handle shaft rotatably supported by the reel body; a handle arm provided at a distal end of the handle shaft; a transmission mechanism that transmits a rotation of the handle shaft to the spool via a drag device capable of adjusting braking force; and a braking force controlling element rotatably supported by the handle shaft, the braking force controlling element including an adjusting portion for adjusting the braking force applied to the drag device and an operation portion for the adjusting portion. The operation portion radially extends from an axis center of the handle shaft, and includes a bent portion which is formed at an intermediate portion of the operation portion and bent toward the reel body side.

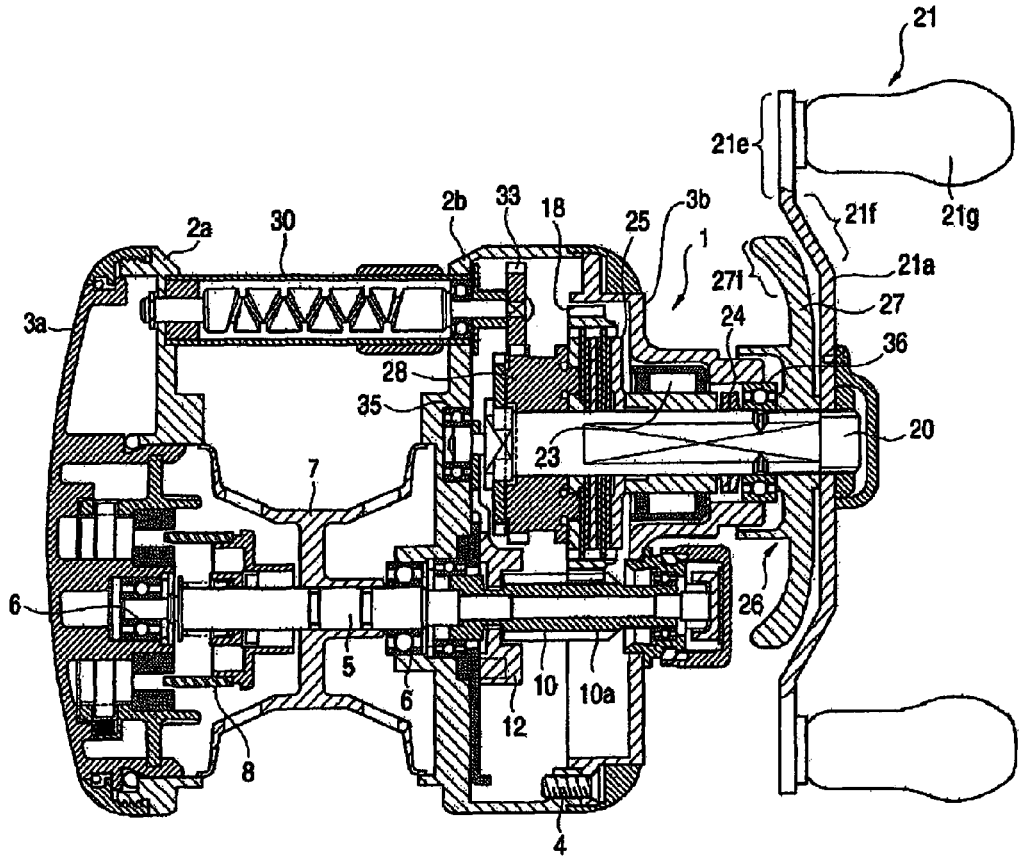

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-3 are cancelled.

\* \* \* \* \*